United States Patent
Chen et al.

(10) Patent No.: US 10,187,875 B2
(45) Date of Patent: *Jan. 22, 2019

(54) UPLINK PROCEDURES FOR LTE/LTE-A COMMUNICATION SYSTEMS WITH UNLICENSED SPECTRUM

(71) Applicant: QUALCOMM Incorporated, San Diego, CA (US)

(72) Inventors: Wanshi Chen, San Diego, CA (US); Peter Gaal, San Diego, CA (US); Durga Prasad Malladi, San Diego, CA (US); Tao Luo, San Diego, CA (US); Tingfang Ji, San Diego, CA (US); Naga Bhushan, San Diego, CA (US); Yongbin Wei, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,160

(22) Filed: Jul. 24, 2017

(65) Prior Publication Data

US 2017/0325201 A1 Nov. 9, 2017

Related U.S. Application Data

(63) Continuation of application No. 14/459,676, filed on Aug. 14, 2014, now Pat. No. 9,717,071.
(Continued)

(51) Int. Cl.
*H04W 72/04* (2009.01)
*H04L 27/00* (2006.01)
(Continued)

(52) U.S. Cl.
CPC .............. *H04W 72/04* (2013.01); *H04L 5/001* (2013.01); *H04L 5/003* (2013.01);
(Continued)

(58) Field of Classification Search
None
See application file for complete search history.

(56) References Cited

U.S. PATENT DOCUMENTS 8,861,452 B2 10/2014 Barbieri et al.
9,717,071 B2 7/2017 Chen et al.
(Continued)

FOREIGN PATENT DOCUMENTS

EP 2160048 A1 3/2010
GB 2494132 A 3/2013
(Continued)

OTHER PUBLICATIONS

International Search Report and Written Opinion—PCT/US2014/051183—ISA/EPO—dated Apr. 29, 2015.
(Continued)

*Primary Examiner* — Christine T Duong
(74) *Attorney, Agent, or Firm* — Norton Rose Fulbright US LLP

(57) ABSTRACT

Long term evolution (LTE)/LTE-Advanced (LTE-A) deployments with unlicensed spectrum leverage more efficient LTE communication aspects over unlicensed spectrum, such as over WIFI radio access technology. In order to accommodate such communications, various uplink procedures may be modified in order to handle communications between licensed and unlicensed spectrum with LTE/LTE-A deployments with unlicensed spectrum.

30 Claims, 15 Drawing Sheets

Related U.S. Application Data

(60) Provisional application No. 61/866,925, filed on Aug. 16, 2013.

(51) Int. Cl.
| | |
|---|---|
| *H04W 74/08* | (2009.01) |
| *H04W 72/12* | (2009.01) |
| *H04L 5/00* | (2006.01) |
| *H04W 16/14* | (2009.01) |

(52) U.S. Cl.
CPC ..... *H04L 27/0006* (2013.01); *H04W 72/1215* (2013.01); *H04W 74/0833* (2013.01); *H04W 16/14* (2013.01)

(56) References Cited

U.S. PATENT DOCUMENTS

| | | |
|---|---|---|
| 2010/0208681 A1 | 8/2010 | Elmaleh |
| 2013/0021993 A1* | 1/2013 | Chou ................ H04W 56/0045 370/329 |
| 2013/0203429 A1 | 8/2013 | Kneckt et al. |
| 2014/0029561 A1 | 1/2014 | Kim et al. |
| 2014/0079015 A1 | 3/2014 | Kim et al. |
| 2014/0126489 A1 | 5/2014 | Zakrzewski |
| 2014/0161002 A1 | 6/2014 | Gauvreau et al. |
| 2015/0057011 A1* | 2/2015 | Di Girolamo .... H04W 74/0808 455/454 |

FOREIGN PATENT DOCUMENTS

| | | |
|---|---|---|
| WO | WO-2012024346 A1 | 2/2012 |
| WO | WO-2012049533 A1 | 4/2012 |
| WO | WO-2012109195 A2 | 8/2012 |
| WO | WO-2012141463 A2 | 10/2012 |
| WO | WO-2013006006 A2 | 1/2013 |
| WO | WO-2013010323 A1 | 1/2013 |

OTHER PUBLICATIONS

Ericsson: "Contents of RRC Connection Request", 3GPP Draft; R2-99415, 3rd Generation Partnership Project (3GPP), Mobile Competence Centre, 650, Route Des Lucioles, F-06921, Sophia-Antipolis Cedex, France, vol. RAN WG2, No. Berlin; 19990521, May 21, 1999, XP050112672, [retrieved on May 21, 1999], 4 pages.

* cited by examiner

UPLINK PROCEDURES FOR LTE/LTE-A COMMUNICATION SYSTEMS WITH UNLICENSED SPECTRUM

CROSS-REFERENCE TO RELATED APPLICATIONS

This application claims the benefit of U.S. patent application Ser. No. 14/459,676, entitled, "UPLINK PROCEDURES FOR LTE-U COMMUNICATION SYSTEMS", filed on Aug. 14, 2014 and U.S. Provisional Patent Application No. 61/866,925, entitled, "UPLINK PROCEDURES FOR LTE-U COMMUNICATION SYSTEMS", filed on Aug. 16, 2013, which are expressly incorporated by reference herein in their entirety.

BACKGROUND

Field

Aspects of the present disclosure relate generally to wireless communication systems, and more particularly, to uplink procedures for long term evolution (LTE)/LTE-Advanced (LTE-A) communication systems with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes generating, at a UE, a random access request, wherein the UE is configured to transmit communication signals to a serving base station over at least unlicensed spectrum and receive communication signals from the serving base station, transmitting, by the UE, the random access request to the serving base station over a first carrier of one or more carriers operated in a cell serviced by the serving base station, and monitoring the one or more carriers, by the UE, for a random access response for connecting to the cell.

In an additional aspect of the disclosure, an apparatus configured for wireless communication includes means for generating, at a UE, a random access request, wherein the UE is configured to transmit communication signals to a serving base station over at least unlicensed spectrum and receive communication signals from the serving base station, means for transmitting, by the UE, the random access request to the serving base station over a first carrier of one or more carriers operated in a cell serviced by the serving base station, and means for monitoring the one or more carriers, by the UE, for a random access response for connecting to the cell.

In an additional aspect of the disclosure, a computer program product has a computer-readable medium having program code recorded thereon. This program code includes program code to generate, at a UE, a random access request, wherein the UE is configured to transmit communication signals to a serving base station over at least unlicensed spectrum and receive communication signals from the serving base station, code to transmit, by the UE, the random access request to the serving base station over a first carrier of one or more carriers operated in a cell serviced by the serving base station, and code to monitor the one or more carriers, by the UE, for a random access response for connecting to the cell.

In an additional aspect of the disclosure, an apparatus includes at least one processor and a memory coupled to the processor. The processor is configured to generate, at a UE, a random access request, wherein the UE is configured to transmit communication signals to a serving base station over at least unlicensed spectrum and receive communication signals from the serving base station, to transmit, by the UE, the random access request to the serving base station over a first carrier of one or more carriers operated in a cell serviced by the serving base station, and to monitor the one or more carriers, by the UE, for a random access response for connecting to the cell.

DETAILED DESCRIPTION

Figure 1:
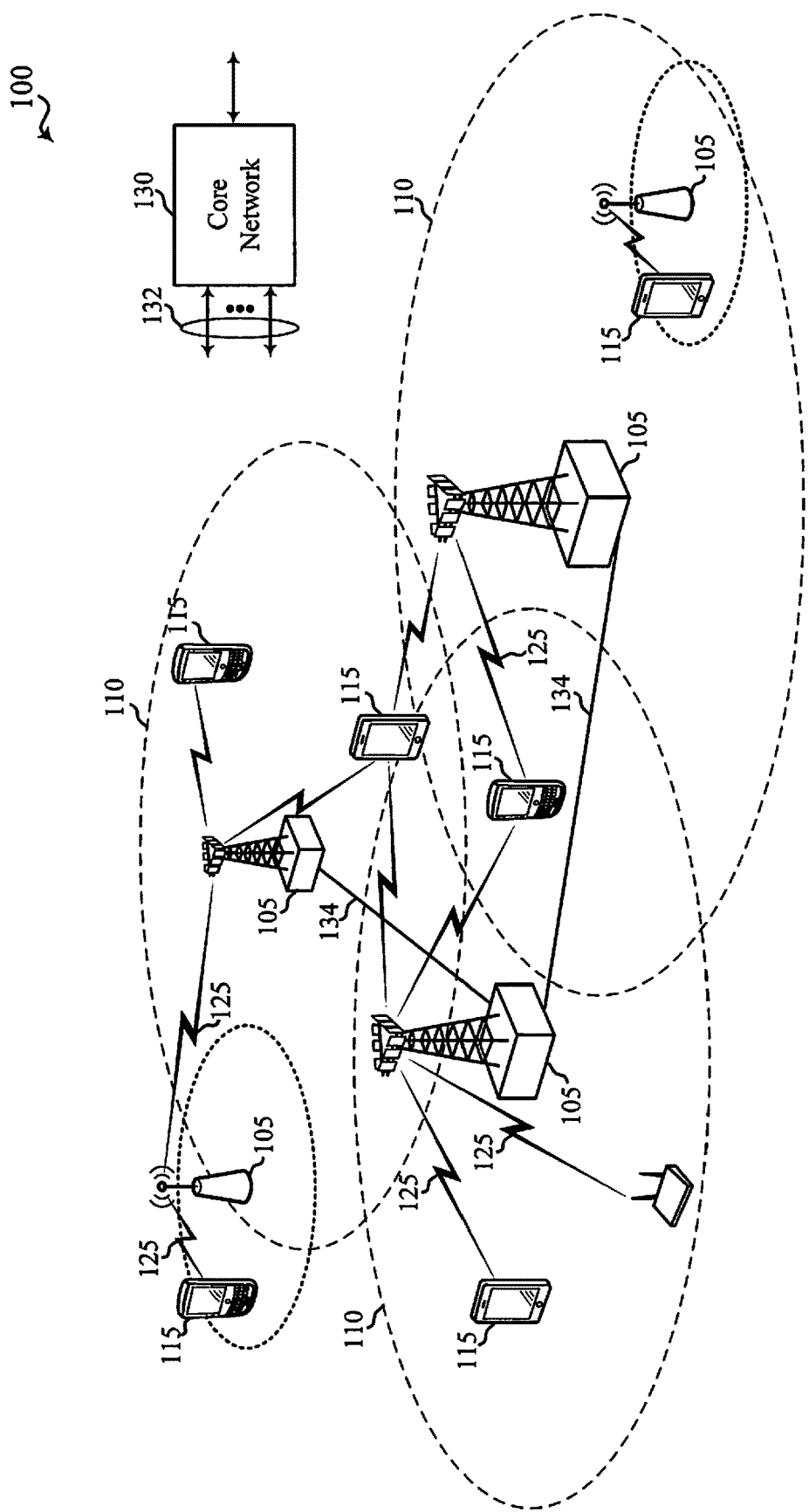
FIG. 1 shows a diagram that illustrates an example of a wireless communications system according to various embodiments.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WiFi as the primary mechanism to use unlicensed spectrum to relieve ever increasing levels of congestion in cellular networks. However, a new carrier type (NCT) based on LTE/LTE-A in an unlicensed spectrum may be compatible with carrier-grade WiFi, making LTE/LTE-A with unlicensed spectrum an alternative to WiFi. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WiFi. For example, an all LTE/LTE-A deployment with unlicensed spectrum (for single or multiple operators) compared to an all WiFi deployment, or when there are dense small cell deployments, LTE/LTE-A with unlicensed spectrum may perform significantly better than WiFi. LTE/LTE-A with unlicensed spectrum may perform better than WiFi in other scenarios such as when LTE/LTE-A with unlicensed spectrum is mixed with WiFi (for single or multiple operators).

For a single service provider (SP), an LTE/LTE-A network on an unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A with and without unlicensed spectrum for a given SP. An LTE/LTE-A network with unlicensed spectrum may provide unicast and/or multicast services according to the needs of the SP. Moreover, LTE/LTE-A network with unlicensed spectrum may operate in a bootstrapped mode in which LTE cells act as anchor and provide relevant unlicensed band cell information (e.g., radio frame timing, common channel configuration, system frame number or SFN, etc.). In this mode, there may be close interworking between LTE/LTE-A with and without unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network. In this case, there may be a loose interworking between LTE/LTE-A with and without unlicensed spectrum on RLC-level aggregation with co-located licensed and unlicensed band cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A)

are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more communication modes of operation or deployment scenarios using unlicensed spectrum. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without unlicensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A deployment scenarios or modes of operation with unlicensed spectrum in a system such as the system 100, as well as other features and functions related to the operation of LTE/LTE-A with unlicensed spectrum, are provided below with reference to FIGS. 2A-14B.

Figure 2A:
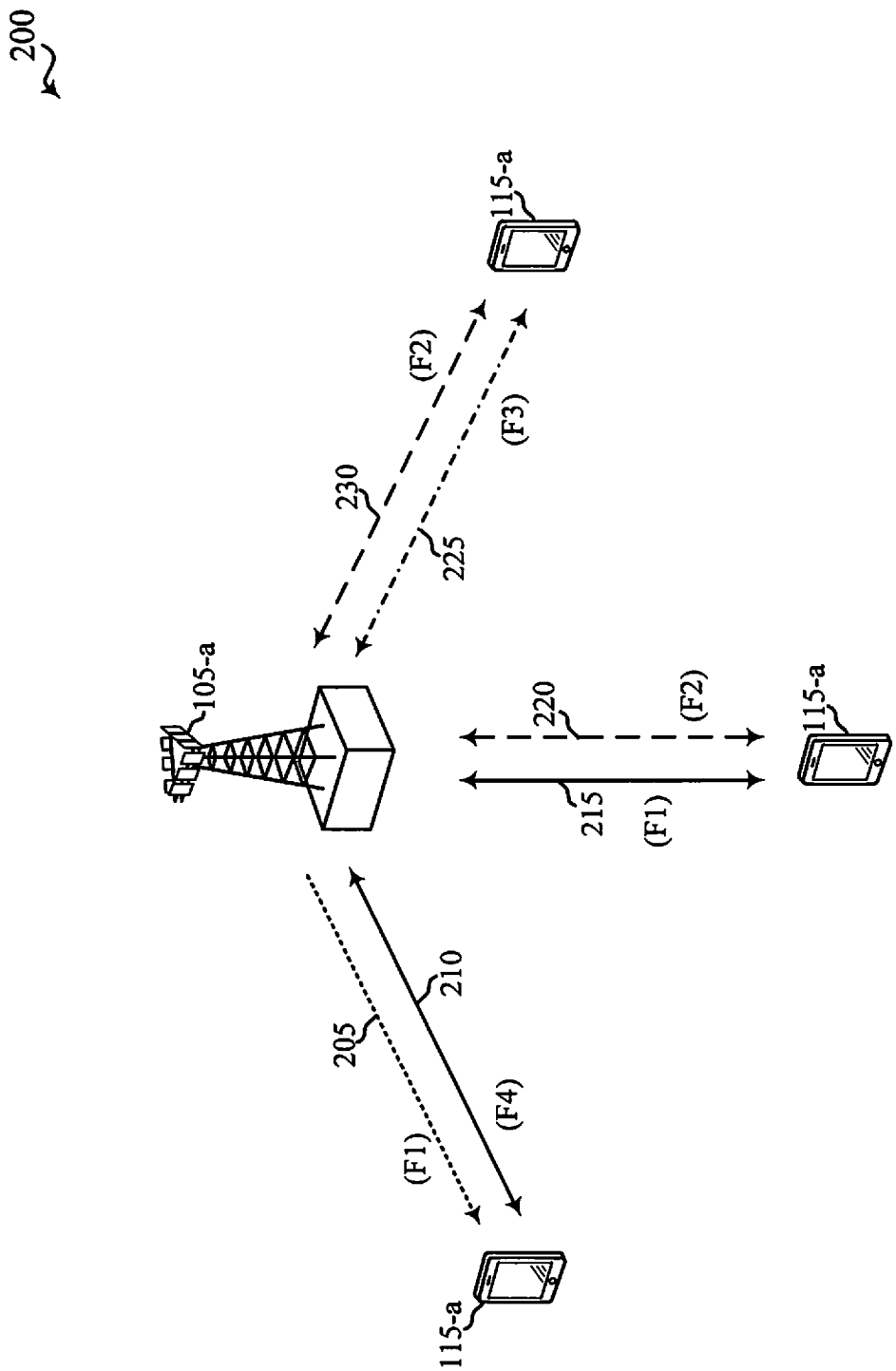
FIG. 2A shows a diagram that illustrates examples of deployment scenarios for using LTE in an unlicensed spectrum according to various embodiments.

Turning next to FIG. 2A, a diagram 200 shows examples of a supplemental downlink mode and of a carrier aggregation mode for an LTE/LTE-A network that supports communications using unlicensed spectrum. The diagram 200 may be an example of portions of the system 100 of FIG. 1. Moreover, the base station 105-a may be an example of the base stations 105 of FIG. 1, while the UEs 115-a may be examples of the UEs 115 of FIG. 1.

In the example of a supplemental downlink mode in diagram 200, the base station 105-a may transmit OFDMA communications signals to a UE 115-a using a downlink 205. The downlink 205 is associated with a frequency F1 in an unlicensed spectrum. The base station 105-a may transmit OFDMA communications signals to the same UE 115-a using a bidirectional link 210 and may receive SC-FDMA communications signals from that UE 115-a using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-a. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-a may transmit OFDMA communications signals to a UE 115-a using a bidirectional link 215 and may receive SC-FDMA communications signals from the same UE 115-a using the bidirectional link 215. The bidirectional link 215 is associated with the frequency F1 in the unlicensed spectrum. The base station 105-a may also transmit OFDMA communications signals to the same UE 115-a using a bidirectional link 220 and may receive SC-FDMA communications signals from the same UE 115-a using the bidirectional link 220. The bidirectional link 220 is associated with a frequency F2 in a licensed spectrum. The bidirectional link 215 may provide a downlink and uplink capacity offload for the base station 105-a. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-a may transmit OFDMA communications signals to a UE 115-a using a bidirectional link 225 and may receive SC-FDMA communications signals from the same UE 115-a using the bidirectional link 225. The bidirectional link 225 is associated with the frequency F3 in an unlicensed spectrum. The base station 105-a may also transmit OFDMA communications signals to the same UE 115-a using a bidirectional link 230 and may receive SC-FDMA communications signals from the same UE 115-a using the bidirectional link 230. The bidirectional link 230 is associated with the frequency F2 in the licensed spectrum. The bidirectional link 225 may provide a downlink and uplink capacity offload for the base station 105-a. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
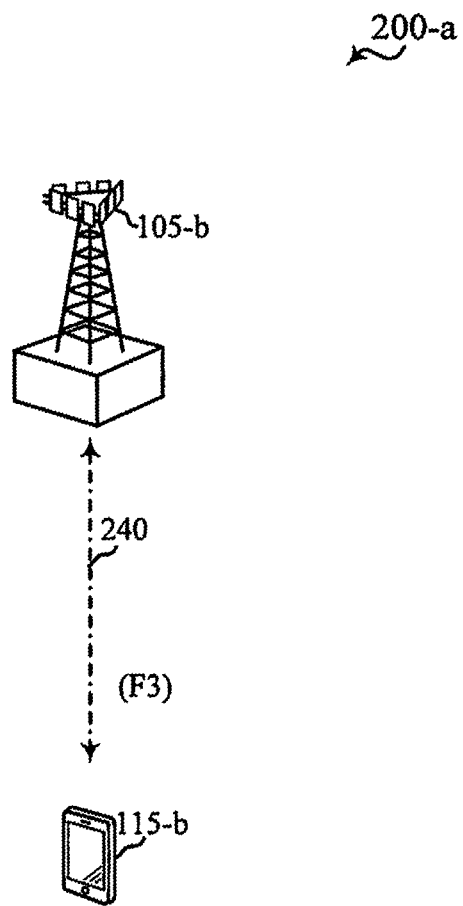
FIG. 2B shows a diagram that illustrates another example of a deployment scenario for using LTE in an unlicensed spectrum according to various embodiments.

FIG. 2B shows a diagram 200-a that illustrates an example of a standalone mode for LTE/LTE-A with unlicensed spectrum. The diagram 200-a may be an example of portions of the system 100 of FIG. 1. Moreover, the base station 105-b may be an example of the base stations 105 of FIG. 1 and the base station 105-a of FIG. 2A, while the UE 115-b may be an example of the UEs 115 of FIG. 1 and the UEs 115-a of FIG. 2A.

In the example of a standalone mode in diagram 200-a, the base station 105-b may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the PCC on the unlicensed spectrum. Moreover, LBT may be implemented on both the base station and the UE.

Figure 3:
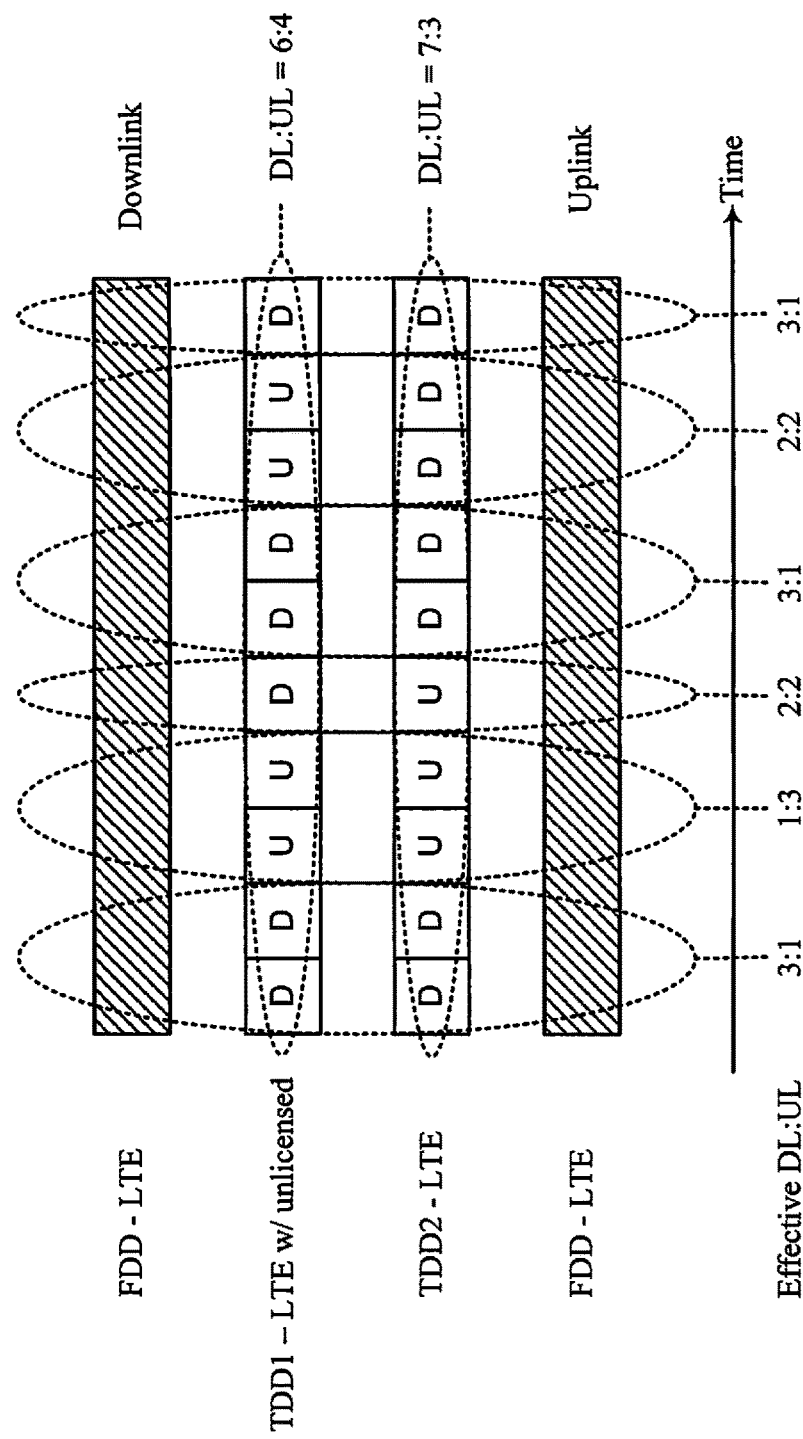
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with and without unlicensed spectrum.

Figure 4:
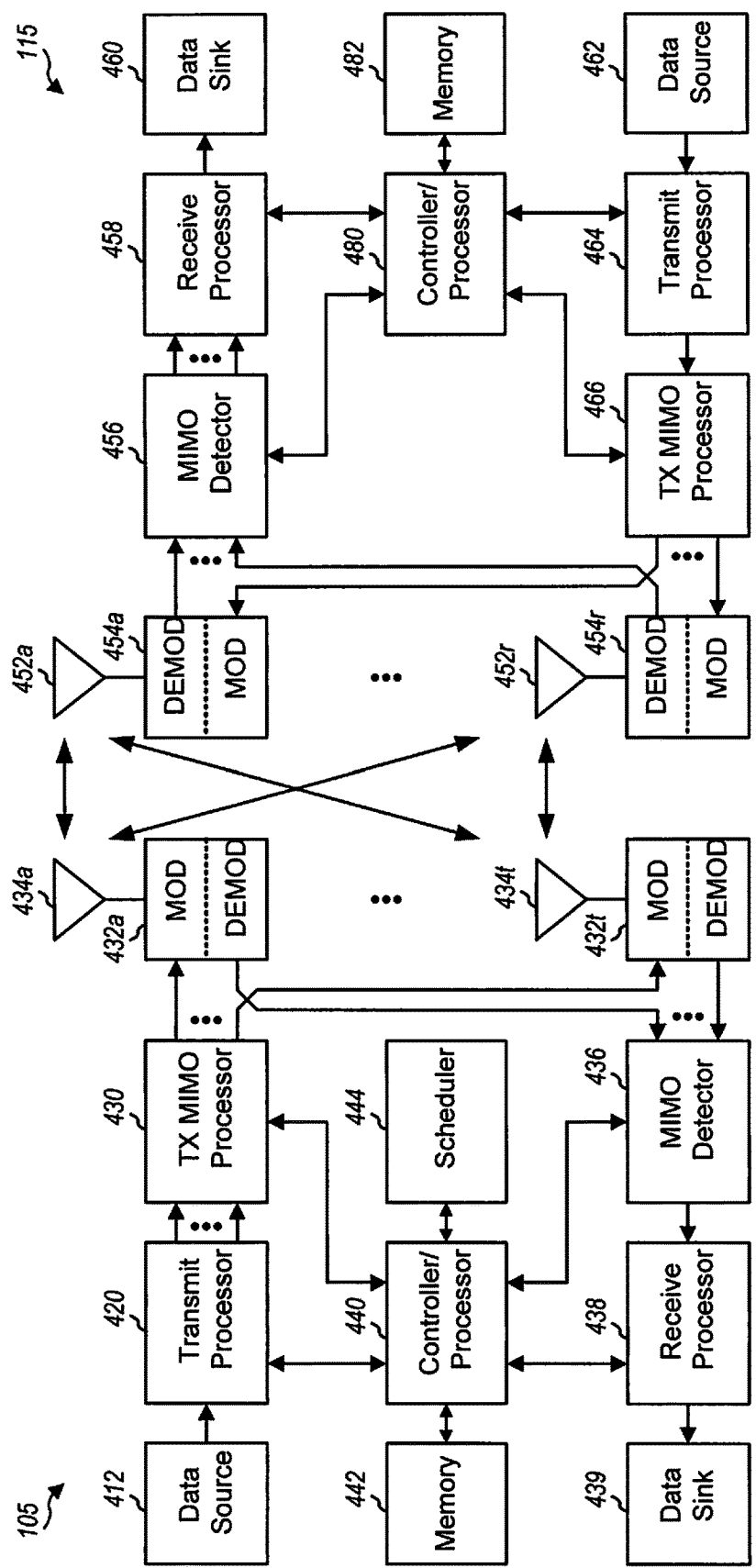
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434*a* through 434*t*, and the UE 115 may be equipped with antennas 452*a* through 452*r*. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 115, the antennas 452*a* through 452*r* may receive the downlink signals from the eNB 105 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 8A-8B and 13A-13B, and/or other processes for the techniques described herein. The memories 442 and 482 may store data and program codes for the eNB 105 and the UE 115, respectively. A scheduler 444 may schedule UEs for data transmission on the downlink and/or uplink.

With the implementation of wireless technologies for communication using LTE/LTE-A with unlicensed spectrum, various adaptations may be desirable in order to accommodate LTE operations over an unlicensed band with efficiency and a little change from the current LTE standards as possible. For example, various uplink procedures may be adapted for LTE operations with unlicensed spectrum in LTE/LTE-A deployments with unlicensed spectrum.

Similar to the downlink structure in LTE/LTE-A operations with unlicensed spectrum, there are a certain number of transmission opportunities not subject to clear channel assessment (CCA) requirements. Thus, there may be a certain number of transmission opportunities that may also be autonomous or guaranteed (not subject to CCA) in uplink communication. For purposes of this disclosure autonomous transmissions and guaranteed transmissions may be used interchangeably to mean the same guaranteed transmission opportunity. This guaranteed transmission opportunity may be beneficial for transmitting uplink signals/channels in a guaranteed manner. For example, uplink communications that may be important for guaranteed transmission include: sounding reference signals (SRS), which are used in power control and uplink/downlink scheduling, scheduling request (SR), channel state information (CSI) feedback, uplink discovery signals for peer to peer communications, physical random access channel (PRACH), physical uplink shared channel (PUSCH) (e.g., initial PUSCH transmission as part of RACH procedures). This guaranteed transmission opportunity may be applicable to standalone LTE/LTE-A deployments with unlicensed spectrum, as well as potentially to carrier aggregation (CA) deployments.

In addition to the guaranteed transmission of uplink signals, LTE/LTE-A with unlicensed spectrum may also provide additional opportunistic transmission of uplink signals as well. The additional uplink signals that may be opportunistically transmitted in CCA-based subframes may provide additional signal instances that may be received at the associated base stations more frequently than the fixed period. In such CCA-based subframes, if the UE detects a clear CCA, then it may transmit uplink signals at some point before the expiration of the clear period. After detecting a clear CCA, the transmission stream are guaranteed to be available for a predetermined duration, such as 5-10 ms. Thus, the associated base stations may receive certain uplink signals more frequently. However, inter-frequency status should be based on the guaranteed transmission subframes.

Various aspects of the present disclosure provide for different interactions between the downlink autonomous transmissions and the uplink autonomous transmissions. In some aspects of the disclosure, the uplink and downlink autonomous transmissions may be separately managed. Accordingly, each may have different periodicities and/or different subframe offsets. In alternative aspects of the present disclosure, the uplink and downlink autonomous transmissions may be jointly managed. In particular, uplink autonomous transmissions may operate in a slave configuration to the downlink autonomous transmissions. The joint management may, thus, include the same periodicity and/or correlated subframe offsets. Aspects that jointly manage the autonomous transmissions may offer more efficient operations as linking the downlink and uplink operations typically results in improved system performance.

LTE/LTE-A deployments with unlicensed spectrum that use WIFI nodes operate under a 5% flexible transmission budget. The 5% flexible transmission budget prevents a WIFI node from autonomously transmitting more than 5% within any 50 ms period. Accordingly, one aspect of the present disclosure suggests a fixed periodicity of 80 ms for guaranteed transmissions. However, the 5% flexible transmission budget requirements are measured over a 50 ms period. Thus, the fixed period for guaranteed transmissions may also be set to 50 ms. While 80 ms offers the benefit of being more evenly divisible or comparable to many different system parameters, a shorter period, such as 50 ms would provide more opportunities for guaranteed operations. Other times may be considered as well, e.g., 60 ms, 70 ms, and the like.

Figure 5:
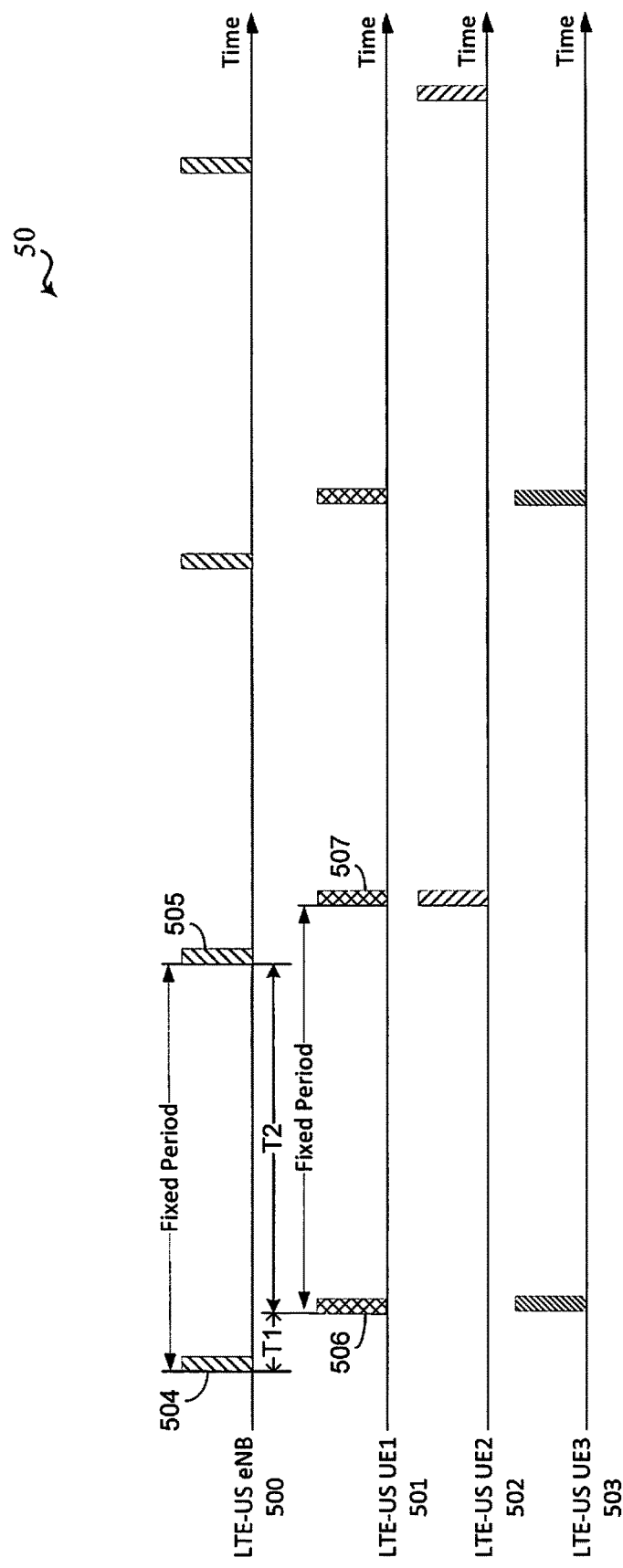
FIG. 5 is a block diagram illustrating a transmission timeline for an LTE/LTE-A deployment with unlicensed spectrum configured according to one aspect of the present disclosure.

FIG. 5 is a block diagram illustrating a transmission timeline 50 for an LTE/LTE-A deployment with unlicensed spectrum configured according to one aspect of the present disclosure. Transmission timeline 50 illustrates the downlink guaranteed transmissions for LTE/LTE-A with unlicensed spectrum (LTE-US) eNB 500 and the uplink guaranteed transmission for LTE-US UE1 501 which are jointly managed. The uplink guaranteed transmissions from LTE-US UE2 502 and LTE-US U3 503 are transmitted according to different periodicities and offsets than the transmissions from LTE-US UE1 501. The different periodicities and offsets may be due to different discontinuous reception (DRX) operations, due to load balancing/interference coordination, or the like. In the joint management scenario of FIG. 5, the uplink guaranteed transmissions of LTE-US UE1 501 are slaved to the downlink guaranteed transmissions of LTE-US eNB 500.

As illustrated in FIG. 5, LTE-US eNB 500 sends its downlink guaranteed transmission and LTE-US UE1 501 sends its corresponding uplink guaranteed transmission a time, T1, after the downlink transmission. Each of LTE-US eNB 500 and LTE-US UE1 501 transmit their respective guaranteed transmissions at the same fixed period, such as, for example, 50 ms, 60 ms, 80 ms, or the like. In consideration of the triggering time, T1, after which LTE-US UE1 501 sends its uplink guaranteed transmission, it may be beneficial to have T1<T2, to facilitate fast random access procedure. The processing time of LTE-US UE1 501 allows LTE-US UE1 501 to receive the downlink guaranteed transmission from LTE-US eNB 500 at 504 and send uplink guaranteed transmissions at 506. Over time T2, LTE-US eNB 500 may process SR, CSI feedback, and the like, received at 506, and send downlink guaranteed transmission 505. LTE-US UE 501 may then transmit uplink guaranteed transmission 507 triggered again by the receipt of downlink guaranteed transmission 505.

It should be noted that the duration of each guaranteed transmission instance in the uplink may be the same or different than that of the downlink guaranteed transmission. For example, the downlink guaranteed transmission occupies 4 symbols over 2 subframes. Thus, in various aspects of the disclosure, the uplink guaranteed transmission may also occupy 4 symbols over 2 subframes. Note that in LTE/LTE-A with unlicensed spectrum, the uplink transmissions may be single carrier frequency division multiple access (SC-FDMA) signals, signals based on multi-cluster resource allocation where each cluster is contiguous resource allocation, signals based on interleaved resource allocation, signals based on OFDM, etc. However, in order to maximize reuse of existing LTE uplink design, a transmission duration of 7 symbols over 1 slot may be a more natural duration than the 4 symbols duration. Thus, in certain aspects of the disclosure, uplink guaranteed transmissions may have a duration of 4 symbols over 2 subframes, while other aspects may use other durations, such as 7 symbols over 1 slot. Other durations are possible as well, e.g., 6 symbols.

Figure 6:
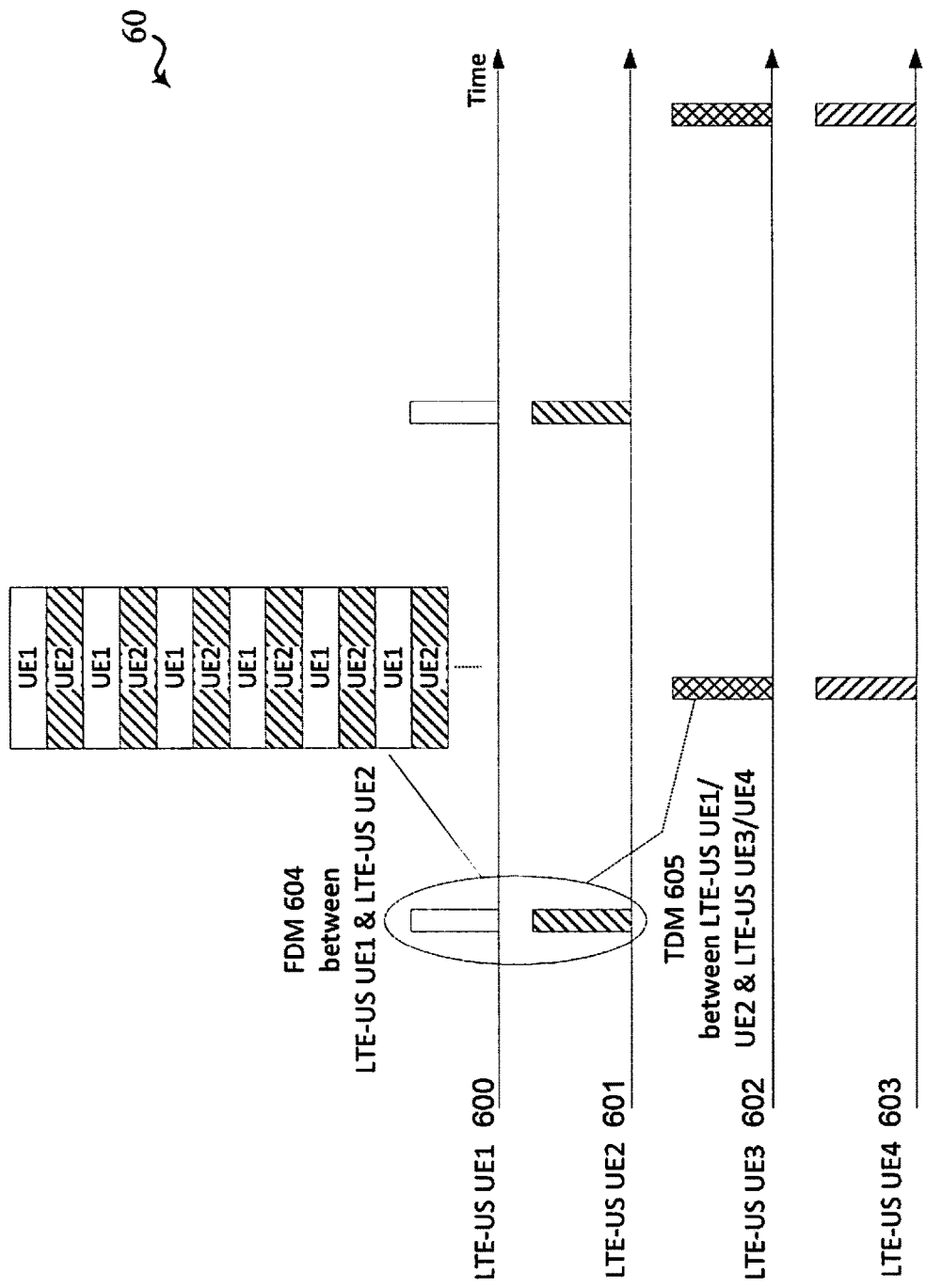
FIG. 6 is a block diagram illustrating a transmission timeline in an LTE/LTE-A deployment with unlicensed spectrum configured according to one aspect of the present disclosure.

FIG. 6 is a block diagram illustrating a transmission timeline 60 in an LTE/LTE-A deployment with unlicensed spectrum configured according to one aspect of the present disclosure. Four transmissions from LTE-US UE1 600-LTE-US UE4 603 represent uplink guaranteed transmissions at fixed intervals. LTE-US UE1 600 and LTE-US UE2 602 transmit their respective guaranteed transmissions at the same time and interval. In order to increase frequency reuse for guaranteed transmissions, the guaranteed transmissions of LTE-US UE1 600 and LTE-US UE2 602 are frequency division multiplexed (FDM) into FDM transmission 604. The guaranteed transmissions from LTE-US UE3 602 and LTE-US UE4 603 are also transmitted at the same time and interval, and may also be FDM into another FDM transmission. Further increasing the reuse of the guaranteed transmissions, the FDM transmission 604 and the FDM transmission of LTE-US UE3 602 and LTE-US UE4 603 may then each be time division multiplexed (TDM) 605. Thus, the reuse may facilitate co-existence of different deployments (e.g., from different operators).

It should be noted that the various reuse scenarios may be realized via TDM within a subframe (different symbols in a subframe, or different slots in a subframe), TDM across subframes (different subframes for different deployments), FDM within a symbol, or a combination thereof.

Figure 7:
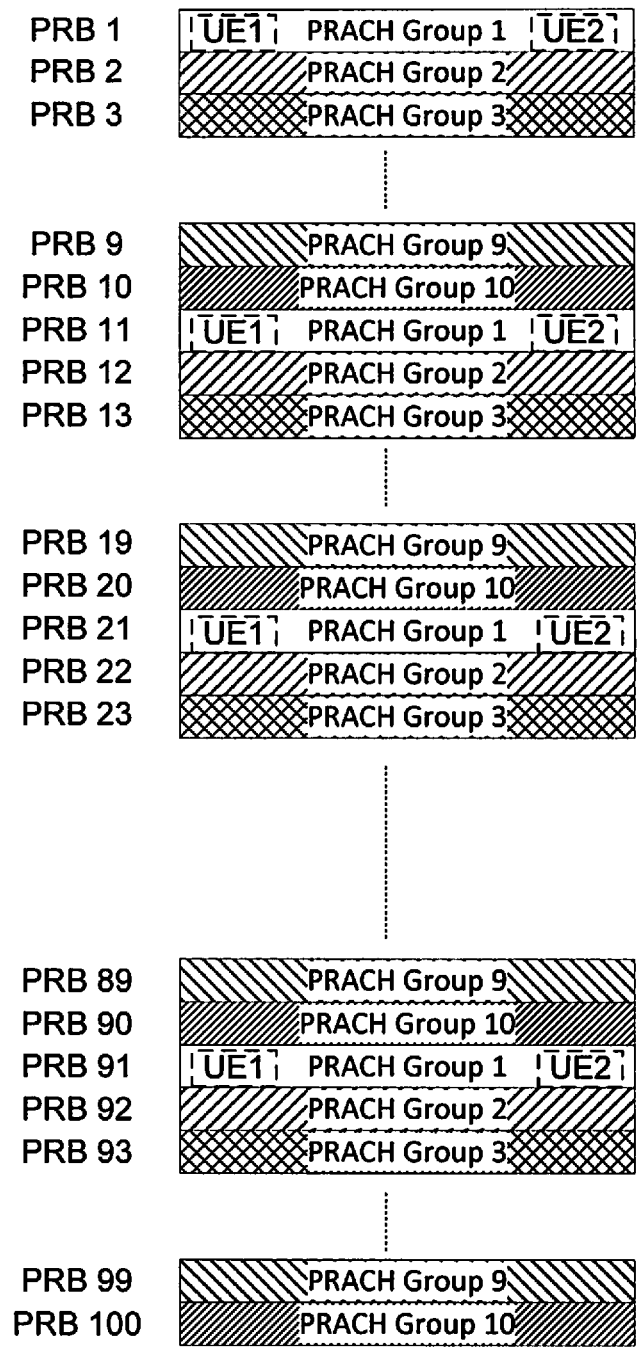
FIG. 7 is a block diagram illustrating a system bandwidth of an LTE/LTE-A deployment with unlicensed spectrum configured according to one aspect of the present disclosure.

One of the uplink signals that may be sent by UEs using the guaranteed transmission subframes identified in LTE/LTE-A deployments with unlicensed spectrum are PRACH/RACH signals. Random access procedures allow for the UE to connect to a new cell whether connecting initially on startup or connecting on handover. When transmitting PRACH using LTE/LTE-A guaranteed transmissions with unlicensed spectrum, the RACH resources may be managed through various levels of multiplexing. FIG. 7 is a block diagram illustrating a system bandwidth 70 of an LTE/LTE-A deployment with unlicensed spectrum configured according to one aspect of the present disclosure. As illustrated, system bandwidth 70 is divided into 100 physical resource blocks. The multiplexing of PRACH may be based on frequency division multiplexing (FDM) and/or code division multiplexing (CDM). For example, as illustrated in FIG. 7, the entire 100 PRBs are be grouped into 10 groups, of 10 PRBs each. Each group may be interleaved in frequency to span at least 80% of system bandwidth 70. For example, PRACH Group 1 occupies every tenth PRB, e.g., PRBs 1, 11, 21, . . . , and 91. In selected aspects of the present disclosure, each PRACH is assigned to only one PRACH group. In additional aspects of the present disclosure, PRACH for different UEs may be multiplexed using CDM within a single group. For example, the PRACH Group 1 instances are illustrated, in the alternative, with PRACH from both UE1 and UE2. The PRACH signaling from UE1 and UE2 are combined through CDM in a single PRACH group.

It should be noted that, while illustrated in the alternative with multiple PRACH groups multiplexed using both FDM and CDM over system bandwidth 70, additional aspects of the preset disclosure may only use CDM for combining PRACH from UEs in the same frequency. The various aspects of the present disclosure are not limited to any specific reuse scheme.

Figures 8A, 8B:
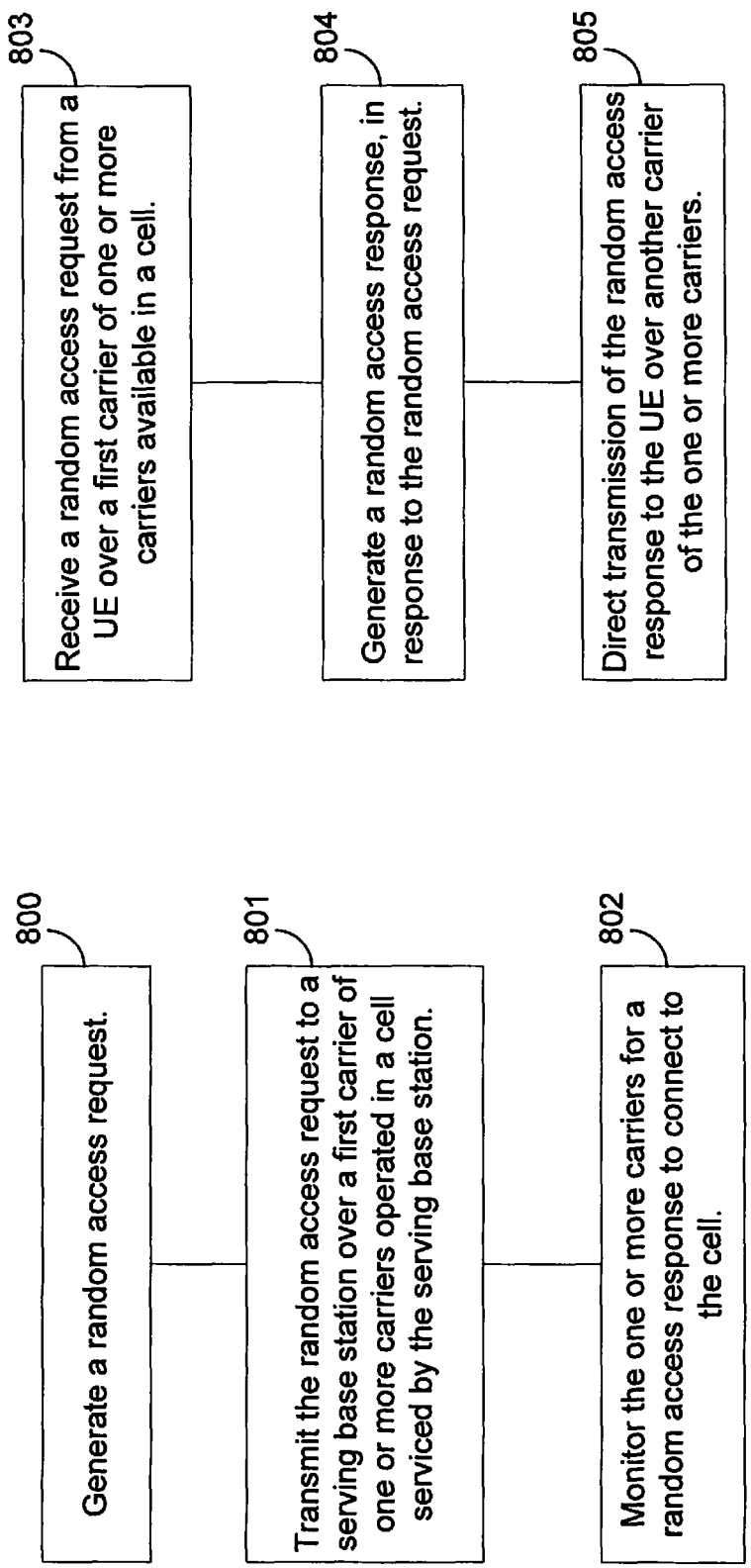
FIGS. 8A and 8B are functional block diagrams illustrating example blocks executed to implement one aspect of the present disclosure.

In LTE communications, random access procedures are performed on a per carrier basis. However, in various aspects of the present disclosure, it may be possible to enable a cross-carrier random access procedure, for example, in an LTE/LTE-A cell with unlicensed spectrum equipped with multiple carriers and UEs capable to wideband RF. FIGS. 8A and 8B are functional block diagrams illustrating example blocks executed to implement one aspect of the present disclosure. At block 800, an LTE/LTE-A UE with unlicensed spectrum generates a random access request for connecting to a cell. At block 801, the UE transmits the random access request to a base station over a first carrier of a plurality of carriers operated in a cell serviced by the serving base station. At block 803, an LTE/LTE-A base station with unlicensed spectrum receives the random access request from the UE over the first carrier of a plurality of carriers available in the cell. At block 802, the UE monitors the plurality of carriers for a random access response to connect to the cell. At block 804, the LTE/LTE-A base station with unlicensed spectrum generates a random access response, in response to the random access request. At block 805, the LTE/LTE-A base station with unlicensed spectrum directs transmission of the random access response to the UE over another carrier of the plurality of carriers. Thus, in such cross-carrier random access procedures, PRACH may be initiated on a first carrier, while the UE monitors a different carrier, either along with or instead of the first carrier, for any random access response.

Figure 9:
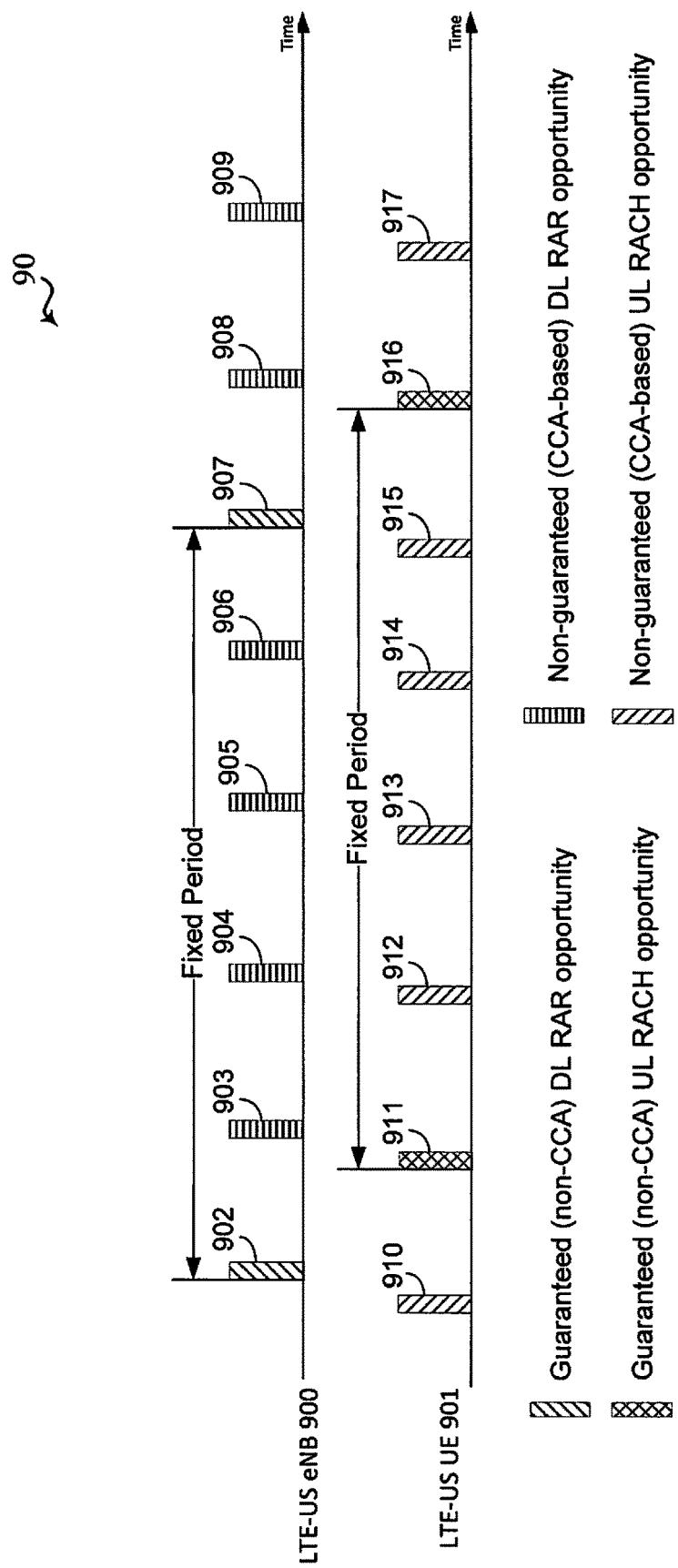
FIG. 9 is a block diagram illustrating a transmission timeline in an LTE/LTE-A communication system with unlicensed spectrum configured according to one aspect of the present disclosure.

In LTE/LTE-A deployments with unlicensed spectrum, the random access procedure may be supported in both guaranteed (non-CCA) and non-guaranteed (CCA) uplink and/or downlink subframes. FIG. 9 is a block diagram illustrating a transmission timeline 90 in an LTE/LTE-A communication system with unlicensed spectrum configured according to one aspect of the present disclosure. Timeline 90 illustrates downlink transmission opportunities from LTE-US eNB 900 and uplink transmission opportunities from LTE-US UE 901. LTE-US UE 901 may transmit uplink RACH either through guaranteed RACH transmission opportunities at non-CCA subframes 911 and 916 or non-guaranteed RACH transmission opportunities at CCA subframes 910, 912-915, and 917 after receiving a CCA clear signal. LTE-US eNB 900 may send random access response (RAR) messages also either through guaranteed RAR transmission opportunities at non-CCA subframes 902 and 907 or non-guaranteed RAR transmission opportunities at CCA subframes 903-906, 908, and 909 after receiving a CCA clear signal. Guaranteed transmission opportunities of RACH and RAR messages occur at the fixed period associated with guaranteed transmissions (e.g., 50 ms, 60 ms, 80 ms, etc.). The set of subframes for RACH opportunities can be maintained by an eNB.

It should be noted that in various aspects of the present disclosure, only one PRACH format is sufficient. Due to reduced coverage range for LTE/LTE-A nodes with unlicensed spectrum, PRACH may occupy a fraction of a subframe. For example, the PRACH request may only be provided in one slot or one or more symbols (similar to PRACH format 4). The actual channel can be similar to PUSCH (or PUCCH) for the case of simplified RACH procedure, since it contains some payload.

In typical RACH procedures a UE transmits the random access request and then waits for a certain response window before a RACH re-transmission is triggered. Each successive re-transmission is also ramped up with power. The reasoning for the re-transmission/power ramp-up process is to conserve power, by not transmitting RACH at its maximum power, and gradually increasing the power of the re-transmissions in case the targeted base station simply cannot reliably receive and interpret the random access request. This RACH re-transmission process may involve multiple transmissions until the UE receives the corresponding random access response, and these multiple transmissions may have power ramp-ups with a step size (including 0 dB or no power ramp-ups) configurable by an LTE/LTE-A base station with unlicensed spectrum. However, in order to determine whether to perform a re-transmission of PRACH in an LTE/LTE-A deployment with unlicensed spectrum, the UE should be capable of distinguishing the following two transmissions states of a cell: State 1 is an incapable transmission state in which the cell does not have a chance to transmit the response within a given response window. In the incapable transmission state, the base station has not had an opportunity within the response window to transmit a random access response because there either has been no guaranteed transmission subframes (non-CCA subframes) or the base station has not been able to detect a clearance during a CCA, non-guaranteed subframe. State 2 is a capable state in which the cell has had chance to transmit the response within the given response window, either because it has had a guaranteed subframe or has detected clearance on a CCA subframe, but the UE has still not received the response. With State 2, the UE may not receive the response because of various reasons, such as the eNB failing to receive the request message, or even the UE failing to receive the response from the base station, etc.

The UE should be able to detect these two states and take different actions accordingly. The detection may be based on detection of channel usage pilot signals (CUPS), sometimes referred to as channel usage beacon signals (CUBS), cell-specific reference signals (CRS), channel state information reference signals (CSI-RS), etc. If the UE detects one of these reference signals, that means that the base station has been able to make transmissions, which means that it has either had a guaranteed subframe or a CCA-cleared subframe. The UE would, therefore determine that the base station is in State 2, the capable transmission state, and would trigger re-transmission after the response window has expired without receiving a random access response. However, if the UE fails to detect any reference signal transmissions from the base station, that may mean that the base station has not encountered either a guaranteed subframe or a CCA-cleared subframe. In this situation, the UE would determine that the base station is in State 1, the incapable transmission state. In State 1, the UE should not attempt re-transmissions and should extending the response window for the base station to be able to respond. If the extended response window again passes with the UE having received the response, then the UE may attempt re-transmissions.

With reference to FIG. 9, LTE-US UE 901 transmits an initial random access request at guaranteed subframe 911 and begins to monitor for a random access response from LTE-US eNB 900. The first RAR transmission opportunity arises at non-guaranteed subframe 903. However, at subframe 903, LTE-US eNB 900 does not detect a CCA-clear. Therefore, LTE-US eNB 900 is incapable of any transmissions. LTE-US UE 901 $w$ continues to monitor during the response window for the random access response. At each of non-guaranteed subframes 904 and 905, LTE-US eNB 900 fails to detect a CCA-clear. As such, LTE-US UE 901 does not receive a random access response message. The response window ends for LTE-US UE 901 at the time associated with non-guaranteed subframe 905. However, LTE-US UE 901 has not detected any reference signals from LTE-US eNB 900 since transmitting the initial random access request at subframe 911. LTE-US UE 901, therefore, determines that LTE-US eNB 900 is in an incapable transmission state and, accordingly, extends the response window and associate re-transmission time gap. At guaranteed subframe 907, LTE-US eNB 900 still does not send a random access response message to LTE-US UE 901. With the occurrence of the guaranteed subframe 907, UE 901 now determines that LTE-US eNB 900 is in a capable transmission state, but because it still has not received a random access response from LTE-US eNB 900, LTE-US UE 901 triggers a re-transmission and ramp-up of transmission power at guaranteed subframe 916. As such, the PRACH re-transmission process is updated for the LTE/LTE-A deployment with unlicensed spectrum to save unnecessary re-transmission and ramp-up of PRACH transmission power.

As noted, LTE/LTE-A UEs with unlicensed spectrum can look for the random access response in both guaranteed and non-guaranteed subframes. The response window can take into account the differences among three different subframe types at the LTE/LTE-A base station with unlicensed spectrum: guaranteed subframes; CCA-cleared non-guaranteed subframes; and CCA-not-cleared non-guaranteed subframes. As an example, the UE may monitor the response starting from N-ms after PRACH transmission and keep monitoring until the end of a guaranteed subframe, or alternatively, either a CCA-cleared non-guaranteed subframe or a guaranteed subframe.

It should be noted that CUPS/CUBS may be used for both channel synchronization and channel reservation. After determining that unlicensed spectrum is available (e.g., by performing a successful CCA), a base station may fill each of the CCA slots following its performance of a successful CCA with CUPS/CUBs. The CUPS/CUBS may include one or more signals that are detectable by other devices to let the other devices know the unlicensed spectrum (or at least a channel thereof) has been reserved for use by another device. CUPS/CUBs may be detected by both LTE and WiFi devices. Unlike most LTE signals, however, which begin at a subframe boundary, CUPS/CUBS may begin at an OFDM symbol boundary. That is, a device that performs a CCA for the channel after another device begins to transmit CUPS/CUBS on the channel may detect the energy of the CUPS/CUBS and determine that the channel is currently unavailable.

Considering the non-guaranteed subframes and length of time between guaranteed subframes, aspects of the present disclosure set the response window or time gap between re-transmissions to take into account the extended response window. For example, one possibility is to determine the time gap based on first subframe (or frame) that the base station has a chance to respond, either due to encountering a guaranteed subframe or CCA cleared non-guaranteed subframe.

For guaranteed transmissions of uplink signals no CCA investigation is necessary. However, if a UE has been idle for a long time (e.g., for two or more consecutive frames), then the UE may immediately send PRACH or other uplink transmissions without violating the 5% duty cycle flexible transmission rule over the predetermined 50 ms. With this scenario, even though the UE may be sending uplink transmissions over a CCA subframe, because of the substantial idle time the uplink transmission will likely not violate the CCA protections.

Figure 10:
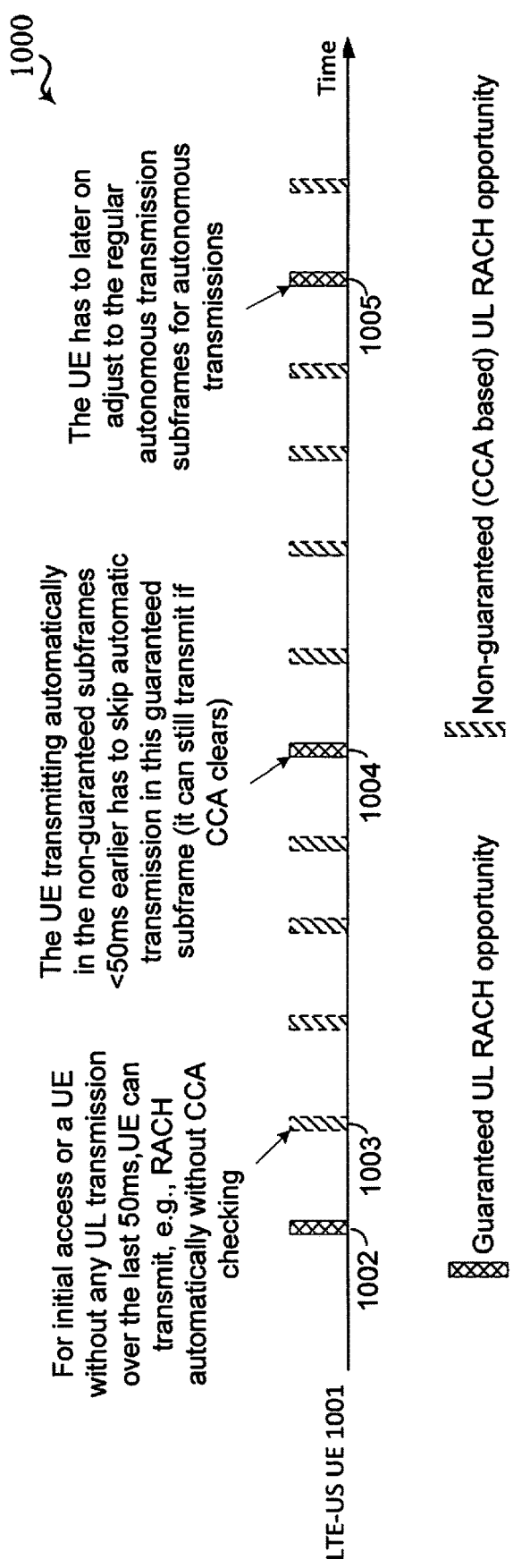
FIG. 10 is a block diagram illustrating a transmission timeline of an LTE/LTE-A UE with unlicensed spectrum configured according to one aspect of the present disclosure.

FIG. 10 is a block diagram illustrating a transmission timeline 1000 of an LTE-US UE 1001 configured according to one aspect of the present disclosure. LTE-US 1001 has been in an idle mode for at least 50 ms before the first illustrated guaranteed transmission opportunity at non-CCA subframe 1002. Because LTE-US UE 1001 has been in an idle mode for this period of time, when LTE-US UE 1001 desires to connect to the cell after non-CCA subframe 1002, it may immediately transmit the random access request at the next available transmission opportunity, which is CCA subframe 1003. While LTE-US UE 1001 would normally be required to first receive a CCA clear before transmitting uplink signals on CCA subframe 1003, because of the substantial idle period, LTE-US UE 1001 is able to transmit the random access request on CCA subframe 1003 without first obtaining the CCA clear. However, the offset for guaranteed initial access may not be aligned with the offset for guaranteed transmission for regular operations. If so, then LTE-US UE 1001 may need to make adjustments to the guaranteed transmissions in order to adjust to the normal offset. For a subsequent transmission opportunity, LTE-US UE 1001 would not be able to transmit again within 50 ms of the initial random access transmission.

The next guaranteed transmission subframe after CCA subframe 1003 is non-CCA subframe 1004. However, non-CCA subframe 1004 is within 50 ms from CCA subframe 1003. If LTE-US UE 1001 were to transmit additional uplink signals or random access re-transmissions at non-CCA subframe 1004, it may then violate the 5% duty cycle flexible transmission limit within the 50 ms period. In such a circumstance, LTE-US UE 1001 may skip transmission on the guaranteed subframe completely. It should be noted, however, that LTE-US UE 1001 may perform a CCA request to determine whether or not such transmissions would, in fact, violate the 5% limit. If LTE-US UE 1001 were to receive a CCA clear, then it could then transmit the additional uplink signals or re-transmitted random access requests. The next guaranteed transmission opportunity for LTE-US UE 1001 fall at non-CCA subframe 1005. Non-CCA subframe 1005 lies outside of the 50 ms window from CCA subframe 1003, but also does not match the offset that starts from CCA subframe 1003. Accordingly, LTE-US UE 1001 may adjust the offset for guaranteed transmission for regular operations, in order to begin guaranteed transmissions at non-CCA subframe 1005.

In the current random access procedure, 4-messages exchange between the UE and base station. The first message, Msg 1, includes the PRACH by UE; the second message, Msg 2, includes the RAR response by the base station; the third message, Msg 3, includes the initial PUSCH transmission, which may contain a radio resource control (RRC) connection request from the UE; and the fourth message, Msg 4, includes connection setup information from the base station, which may contain RRC connection setup and the like. In some situations, such as during handover, the fourth message, Msg 4, would not be necessary.

Figure 11B:
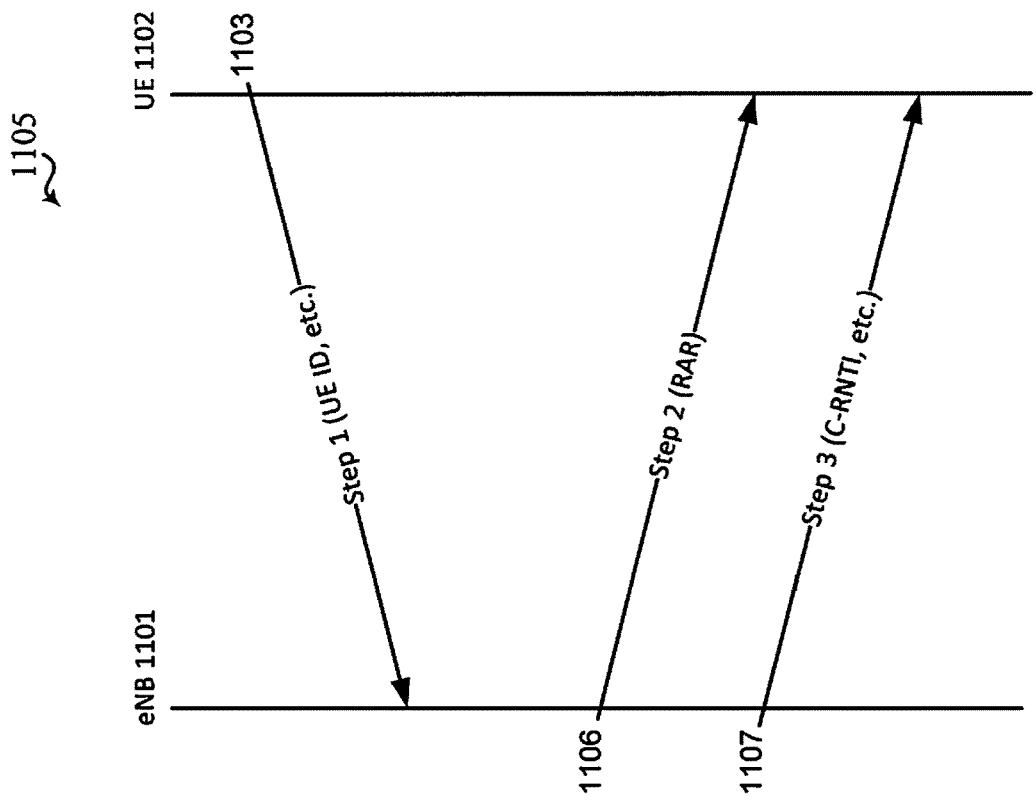
FIG. 11B is a call flow diagram illustrating a call flow in an LTE/LTE-A communication system with unlicensed spectrum between the eNB and UE, configure according to one aspect of the present disclosure.
Figure 11A:
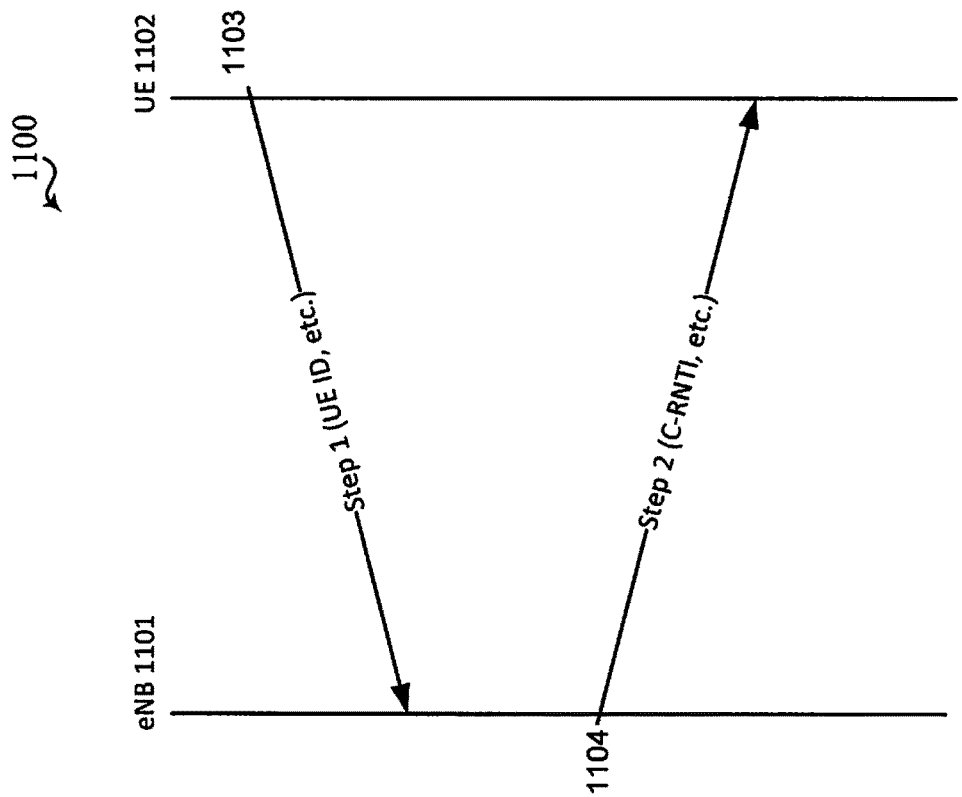
FIG. 11A is a call flow diagram illustrating a call flow in an LTE/LTE-A communication system with unlicensed spectrum between an eNB and UE configured according to one aspect of the present disclosure.

Various aspects of the present disclosure provide for a simplified RACH procedure. For example, various aspects simplify the RACH procedure to 2 or 3 messages. FIG. 11A is a call flow diagram 1100 illustrating a call flow in an LTE/LTE-A communication system with unlicensed spectrum between an eNB 1101 and UE 1102 configured according to one aspect of the present disclosure. At time 1103, UE 1102 sends a combined random access request message that includes the random access request and initial PUSCH transmission. At time 1104, eNB 1101, having received the random access request with the initial PUSCH information, responds with a combined random access response message that includes the random access response to UE 1102 and additional connection setup information, such as the RRC connection setup message.

In various embodiments of the disclosure the 2-step simplified RACH procedure provides a much more efficient process. However, there may be occasions where the latency between Msg 3, which was included by UE 1102 in the combined random access request message, and Msg 4, which was included by eNB 1101 in the combined random access response message. The initial PUSCH waits for acknowledgment that comes with the Msg 4 connection setup information. Thus, while waiting for this confirmation/acknowledgement, UE 1102 may continue monitoring the response window for re-transmission and power ramp-ups of the RACH requests. Accordingly, alternative aspects of the present disclosure provide for a 3-step simplified RACH procedure. FIG. 11B is a call flow diagram 1105 illustrating a call flow in an LTE/LTE-A communication system with unlicensed spectrum between the eNB 1101 and UE 1102, configure according to one aspect of the present disclosure. Similar to the 2-step simplified procedure from FIG. 11A, at time 1103, UE 1102 sends a combined random access request message that includes the random access request and initial PUSCH transmission. At time 1106, eNB 1101, having received the random access request with the initial PUSCH information, sends a random access response message which simply acknowledges the random access request of the combined message at time 1103, such that re-transmissions and power ramp-ups can be stopped. At time 1107, eNB 1101 sends the additional connection setup information. Thus, the potential latency between Msg 3 and Msg 4 is addressed by splitting the messages from eNB 1101 in response to the combined random access request message.

It should be noted that, at least for some scenarios (e.g., handover), the 2-step simplified RACH procedure illustrated in FIG. 11A is sufficient, as the material of Msg 4, combined into the second message at 1104 may not be necessary, which would prevent the latency issue from arising. However, in scenarios in which the latency between Msg 3 and Msg 4 would be large, it may be more efficient to opt for the 3-step simplified RACH procedure illustrated in FIG. 11B. In still further aspects, it may be desirable to have a single simplified alternative RACH procedure for all scenarios.

In various aspects of the present disclosure, as illustrated in FIGS. 11A and 11B, the combined random access request message at 1103 is sent by UE 1102 containing at least the UE identifier (UE ID), such as, for example, the international mobile station equipment identity (IMEI) number. Additionally, UE 1102 may derive a PRACH group and a sequence within the group for transmission of the combined random access request. This derivation can be purely random or, alternatively, based on various information, such as the UE ID, which may be embedded in the random access request. Moreover, in additional aspects, the cyclic redundancy check (CRC) of the combined message should not be scrambled using UE ID, as eNB 1101 would not yet have access to the UE ID.

Additional aspects may also provide more specific information in the combined random access response message send by eNB 1101 at 1104. For example, eNB 1101 may respond with the cell radio network temporary identifier (C-RNTI) assignment, etc. Depending on the latency and the type of RACH procedure (e.g., initial access vs. handover), the latency between step 1 and step 2 can be large (e.g., for initial access, and can be tens of milliseconds) or small (e.g., for handover).

In various aspects of the present disclosure, the second message (e.g., the combined random access response message) of the simplified 2-Step RACH process may be transmitted as a unicast or multicast transmission. Unicast transmissions may be less overhead-efficient compared with multi-cast. If transmitted as a unicast message, the UE IDs may be used to scramble the entire combined random access response message. In multicast, however, the message will contain information for more than one UE. UE IDs may, therefore, be part of the payload in the message. To improve security of the UE-specific information in the multi-cast, the portion of the message containing the UE-specific information may be scrambled with the UE ID corresponding to the UE to which the information is directed.

Figure 12:
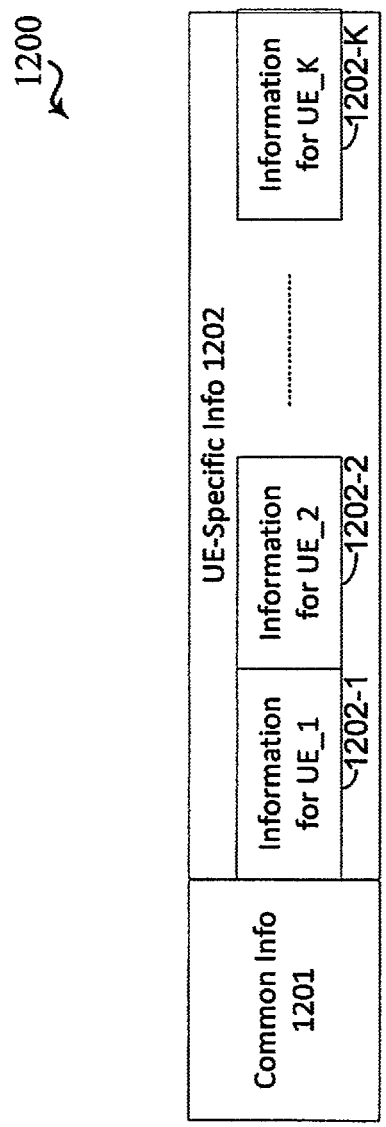
FIG. 12 is a block diagram illustrating a combined random access response message from a base station configured according to one aspect of the present disclosure.

In a multicast transmission aspect, the combined random access response message may be organized into two portions: a common information portion that includes information that may be shared by multiple UEs, and the UE-specific portion, which includes sets of UE-specific information arranged by the UE to which the information relates. FIG. 12 is a block diagram illustrating a combined random access response message 1200 from a base station configured according to one aspect of the present disclosure. Combined random access response message 1200 includes common information portion 1201, which contains various information that may be common to two or more UEs which are associated with a RACH procedure at the base station, and UE-specific information portion 1202, which contains various UE-specific information. For example, as illustrated in FIG. 12, UE-specific information portion 1202 includes specific information for UE_1 1202-1, UE_2 1202-2, through UE_K 1202-K. As noted above, each of the individual UE-specific information subsections 1202-1-1202-K, may be scrambled with the associated UE ID. Thus, another UE may not be capable of viewing relevant UE-specific information about another UE.

It should be noted that in the various aspects of the present disclosure, the UE will both transmit the combined request message and look for the response message from the eNB in both guaranteed and non-guaranteed subframes.

Figures 13A, 13B:
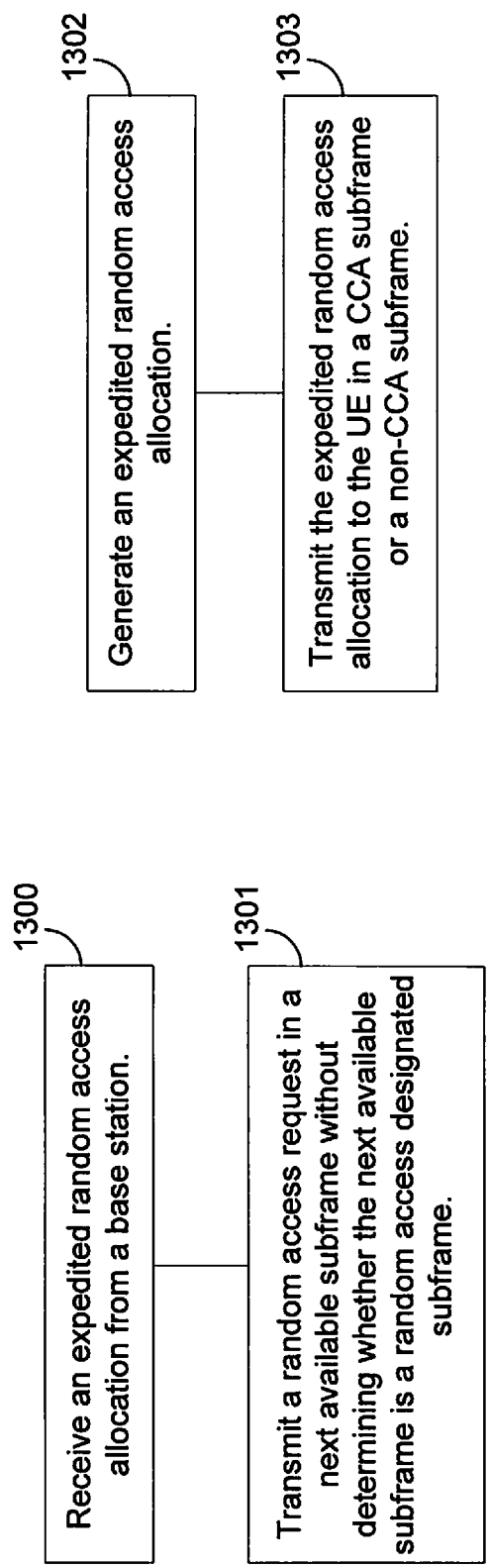
FIGS. 13A and 13B are functional block diagrams illustrating example blocks executed to implement one aspect of the present disclosure.

Besides regular PRACH subframes, which may be transmitted and/or received in guaranteed and non-guaranteed subframes, various aspects of the present disclosure also provide for on-demand PRACH allocations that may be assigned by an eNB to a UE to expedite the RACH procedure, such as during handover. FIGS. 13A and 13B are functional block diagrams that illustrate example blocks executed to implement one aspect of the present disclosure. At block 1300, a base station generates an expedited random access allocation. The expedited random access allocation instructs the UE to begin the RACH process without first performing a CCA check on the subframe. At block 1301, the base station transmits the expedited random access allocation to the UE either in a CCA subframe (cleared non-guaranteed) or a non-CCA subframe (guaranteed). At block 1302, a UE receive the expedited random access allocation from the base station. At block 1303, the UE transmits a random access request in a next available subframe without determining whether the next available subframe is a random access designated subframe. Thus, the UE responds the demand by starting PRACH in a close-by, and what could be a non-regular PRACH subframe.

Typical random access response grants in LTE contain the following information fields: a 1-bit hopping flag, a 10-bit fixed size resource block assignment, a 4-bit truncated modulation and coding scheme (MCS), a 3-bit transmit power control (TPC) command for scheduled PUSCH, a 1-bit uplink delay, a 1-bit CSI request, and additional information, such as the RRC connection setup information. In considering LTE/LTE-A deployments with unlicensed spectrum, the random access request grant may continue to include most of this information with only slight modifications from LTE implementations. For example, the hopping flag may not be necessary, depending on the uplink multiplexing structure. The fixed size resource block assignment may be simplified and/or re-interpreted, for example, to indicate the amount of decimation (e.g., number of combs) and frequency offset in the frequency domain, and/or number of symbols. The LTE/LTE-A RAR with unlicensed spectrum grant may still have the truncated MCS, though the number of bits may be reduced from the standard 4-bit field. The TPC command for scheduled PUSCH is still included. The other RAR grant information, such as the uplink delay, CSI request, and the additional grant information may also be included in the LTE/LTE-A RAR with unlicensed spectrum grant information.

It should be noted that, in general aspects of the present disclosure, a UE configured for transmission over at least unlicensed spectrum generates uplink signals and determines non-CCA subframes over which to transmit at least some of those generated uplink signals to a serving base station. The serving base, which is also configured for communication over at least unlicensed spectrum, identifies non-CCA subframes over which it may receive uplink signals and receives any such uplink signals in the non-CCA subframes over the unlicensed band.

Figures 14A, 14B:
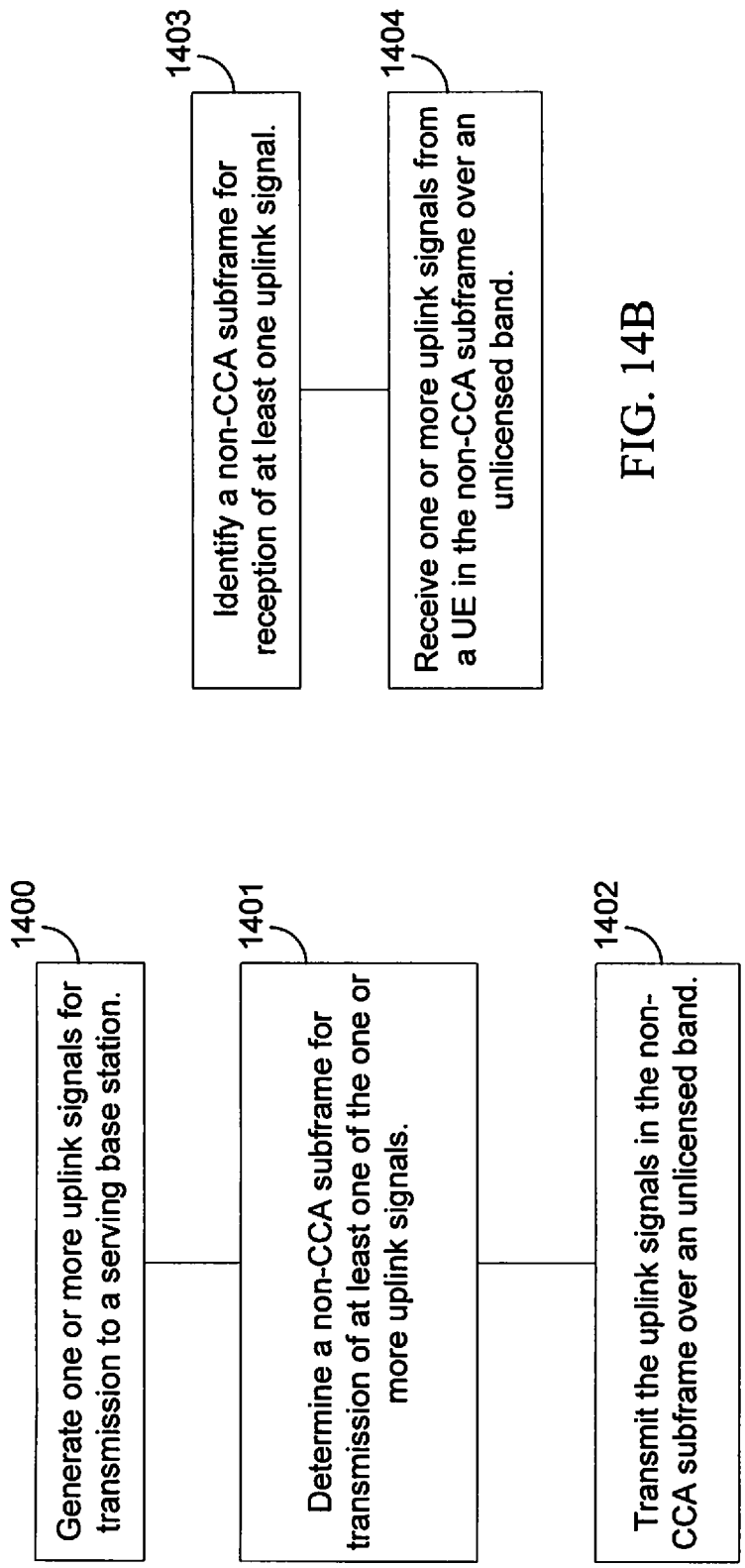
FIGS. 14A and 14B are functional block diagrams illustrating example blocks executed to implement one aspect of the present disclosure.

FIG. 14A is a functional block diagram illustrating example blocks executed to implement one aspect of the present disclosure. At block 1400, a UE generates one or more uplink signals for transmission to a serving base station. The UE of the illustrated aspect is configured to transmit communication signals to a serving base station over at least unlicensed spectrum and to receive communication signals from the serving base station. At block 1401, the UE determines a non-CCA subframe for transmission of at least one of the generated uplink signals. At block 1402, the UE transmits the uplink signals in the non-CCA subframe over an unlicensed band.

FIG. 14B is a functional block diagram illustrating example blocks executed to implement one aspect of the present disclosure. At block 1403, the serving base station identifies a non-CCA subframe for reception of at least one uplink signal. The serving base station of the aspect illustrated in FIG. 14B may serve the UE performing the blocks illustrated in FIG. 14A. The serving base station would be configured for communication over at least unlicensed spectrum. At block 1404, the serving base station receives one or more uplink signals from a UE in the non-CCA subframe over an unlicensed band.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 8A-8B, 13A-13B, and 14A-14B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   generating, at a user equipment (UE), a random access request, wherein the UE is configured to transmit communication signals to a serving base station over at least unlicensed spectrum and to receive communication signals from the serving base station;
   determining, by the UE, a non-clear channel assessment (non-CCA) subframe and a CCA subframe of the unlicensed spectrum;
   transmitting, by the UE, the random access request to the serving base station in the non-CCA subframe over a first carrier of one or more carriers operated in a cell serviced by the serving base station; and
   monitoring the one or more carriers, by the UE, for a random access response to the random access request for connecting to the cell.

2. The method of claim 1, wherein the receiving the communication signals is over the at least unlicensed spectrum.

3. The method of claim 1, wherein the transmitting the random access request includes:
   multiplexing the random access request in frequency with one or more other random access requests from one or more neighboring UEs, wherein the multiplexing is performed over a system bandwidth of the cell.

4. The method of claim 3, wherein the transmitting the random access request further includes:
   multiplexing the random access request in code with one or more additional random access requests from one or more additional neighboring UEs in a same frequency as the random access request.

5. The method of claim 1, wherein the transmitting the random access request includes:
   multiplexing the random access request in code with one or more additional random access requests from one or more additional neighboring UEs in a same frequency as the random access request.

6. The method of claim 1, further including:
   determining a transmission state of the base station; and
   determining whether or not to perform a re-transmission of the random access request in response to the transmission state.

7. The method of claim 6, wherein the transmission state consists of at least one of a capable state, or an incapable state, and in response to the transmission state, determining one of:
   suspending re-transmitting the random access request when the transmission state indicates the base station has been incapable of sending the random access response; or
   re-transmitting the random access request when the transmission state indicates the base station has been capable of sending the random access response.

8. The method of claim 6, further including:
  detecting expiration of a re-transmission time gap without receiving the random access response;
  in response to the transmission state, determining one of:
    extending the re-transmission time gap when the transmission state indicates the base station has been incapable of sending the random access response; or
    re-transmitting the random access request when the transmission state indicates the base station has been capable of sending the random access response.

9. The method of claim 6, wherein the determining the transmission state includes:
  monitoring, by the UE, for one or more reference signals transmitted by the base station;
  determining an incapable transmission state when the UE fails to detect the one or more reference signals;
  determining a capable transmission state when the UE detects the one or more reference signals; and
  determining a capable transmission state when the UE detects a non-CCA subframe.

10. The method of claim 9, wherein the one or more reference signals include one or more of:
  a channel usage pilot signal (CUPS);
  a channel usage beacon signal (CUBS),
  a cell-specific reference signal (CRS); and
  a channel state information reference signals (CSI-RS).

11. The method of claim 1, further including:
  determining, at the UE, that the UE has been in an idle mode for at least a predetermined period,
  wherein the transmitting the random access request is transmitted on one of: a CCA subframe or non-CCA subframe without performing a CCA check.

12. The method of claim 11, further including:
  determining a mismatch of an offset for guaranteed transmission based on the transmitting the random access request without performing the CCA check; and
  adjusting the offset according to the mismatch.

13. The method of claim 11, further including:
  detecting a non-CCA subframe for guaranteed transmission;
  determining the non-CCA subframe is within a restricted transmission period from the transmitting the random access request without performing the CCA check; and
  skipping the guaranteed transmission for the non-CCA subframe based on the determining.

14. The method of claim 1, wherein the random access request occupies a fraction of a subframe.

15. The method of claim 14, wherein the fraction of a subframe includes one or more symbols in a single slot.

16. A method of wireless communication, comprising:
  identifying, by a base station, a non-clear channel assessment (non-CCA) subframe and a CCA subframe of unlicensed spectrum;
  receiving, at the base station, a random access request from a user equipment (UE) in the non-CCA subframe over a first carrier of one or more carriers operated in a cell serviced by the base station, wherein the base station is configured to receive communication signals from the UE over at the least unlicensed spectrum and transmit communication signals to the UE;
  generating a random access response, in response to the random access request; and
  directing transmission of the random access response to the UE over another carrier of one or more carriers.

17. The method of claim 16, wherein the transmitting the communication signals to the UE is performed over at least the unlicensed spectrum.

18. The method of claim 16, wherein the transmission of the random access response occurs in an unlicensed band over one of:
  the non-CCA subframe; or
  the a CCA subframe.

19. The method of claim 16, wherein the random access request occupies a fraction of a subframe.

20. The method of claim 19, wherein the fraction of a subframe includes one or more symbols in a single shot.

21. An apparatus configured for wireless communication, the apparatus comprising:
  at least one processor; and
  a memory coupled to the at least one processor,
  wherein the at least one processor is configured to:
    generate, at a user equipment (UE), a random access request, wherein the UE is configured to transmit communication signals to a serving base station over at least unlicensed spectrum and receive communication signals from the serving base station;
    determine, by the UE, a non-clear channel assessment (non-CCA) subframe and a CCA subframe of the unlicensed spectrum;
    transmit, by the UE, the random access request to the serving base station in the non-CCA subframe over a first carrier of one or more carriers operated in a cell serviced by the serving base station; and
    monitor the one or more carriers, by the UE, for a random access response to the random access request for connecting to the cell.

22. The apparatus of claim 21, wherein the at least one processor is further configured to:
  determine a transmission state of the base station; and
  determine whether or not to perform a re-transmission of the random access request in response to the transmission state.

23. The apparatus of claim 22, wherein the transmission state consists of at least one of a capable state, or an incapable state, and wherein the at least one processor is further configured to, in response to the transmission state, determine one of:
  suspending re-transmitting the random access request when the transmission state indicates the base station has been incapable of sending the random access response; or
  re-transmitting the random access request when the transmission state indicates the base station has been capable of sending the random access response.

24. The apparatus of claim 22, wherein the at least one processor is further configured to:
  detect expiration of a re-transmission time gap without receiving the random access response;
  in response to the transmission state, determine one of:
    extending the re-transmission time gap when the transmission state indicates the base station has been incapable of sending the random access response; or
    re-transmitting the random access request when the transmission state indicates the base station has been capable of sending the random access response.

25. The apparatus of claim 22, wherein the configuration of the at least one processor to determine the transmission state includes configuration of the at least one processor to:
  monitor, by the UE, for one or more reference signals transmitted by the base station;
  determine an incapable transmission state when the UE fails to detect the one or more reference signals;
  determine a capable transmission state when the UE detects the one or more reference signals; and determine a capable transmission state when the UE detects a non-CCA subframe.

26. The apparatus of claim 25, wherein the one or more reference signals include one or more of:
   a channel usage pilot signal (CUPS);
   a channel usage beacon signal (CUBS),
   a cell-specific reference signal (CRS); and
   a channel state information reference signals (CSI-RS).

27. The apparatus of claim 21, wherein the random access request occupies a fraction of a subframe.

28. An apparatus configured for wireless communication, the apparatus comprising:
   at least one processor; and
   a memory coupled to the at least one processor,
   wherein the at least one processor is configured to:
   identify, by a base station, a non-clear channel assessment (non-CCA) subframe and a CCA subframe of unlicensed spectrum;
   receive, at a base station, a random access request from a user equipment (UE) in the non-CCA subframe over a first carrier of one or more carriers operated in a cell serviced by the base station, wherein the base station is configured to receive communication signals from the UE over at least unlicensed spectrum and transmit communication signals to the UE;
   generate a random access response, in response to the random access request; and
   direct transmission of the random access response to the UE over another carrier of one or more carriers.

29. The apparatus of claim 28, wherein the random access request occupies a fraction of a subframe.

30. The apparatus of claim 29, wherein the fraction of a subframe includes one or more symbols in a single slot.

* * * * *